(12) United States Patent
LeDuc et al.

(10) Patent No.: US 6,484,202 B1
(45) Date of Patent: Nov. 19, 2002

(54) METHOD AND APPARATUS FOR DETERMINING THE STATUS OF A TRANSMISSION LINK

(75) Inventors: Douglas Edward LeDuc, Yorkville, IL (US); David Frank Simak, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/441,437

(22) Filed: Nov. 16, 1999

(51) Int. Cl.[7] ............................................... G06F 13/00
(52) U.S. Cl. ...................................... 709/224; 370/248
(58) Field of Search ............................... 704/200, 201, 704/212, 213, 224; 370/242, 244, 248, 251

(56) References Cited

U.S. PATENT DOCUMENTS 6,154,446 A * 11/2000 Kadambi et al. ............ 370/239
6,335,932 B2 * 1/2002 Kadambi et al. ............ 370/391
6,335,935 B2 * 1/2002 Kadambi et al. ............ 370/396

* cited by examiner

Primary Examiner—Moustafa M. Meky
(74) Attorney, Agent, or Firm—John B. MacIntyre

(57) ABSTRACT

The present invention provides a method, apparatus, and communication system (100) for determining the status of a transmission link (108) between a first port (105) of a first device (104) and a second port (107) of a second device (106). The communication system (100) includes a management device (102). The management device (102) includes an input port (103) and a processor (116). The management device (102) receives a first status of the first port (105) and a second status of the second port (107) on the input port (103). The management device (102) calculates at the processor (116) the status of the transmission link (108) based on the first status and the second status.

30 Claims, 3 Drawing Sheets

METHOD AND APPARATUS FOR DETERMINING THE STATUS OF A TRANSMISSION LINK

FIELD OF THE INVENTION

The present invention relates generally to communication systems, and more particularly to a method and apparatus for determining the status of a transmission link in a communication system.

BACKGROUND OF THE INVENTION

Communication systems typically include multiple devices that communicate with each other over links connecting the devices. These links, commonly referred to as transmission links, are typically wirelines that run between ports on the devices.

Each device in a typical network knows the status of its ports. However, the device is typically not aware of the status of ports on other devices. Consequently, each device does not know the status of the link, since the status of the link is determined by the status of the two ports that the link is connected to. Therefore, each device is only aware of the status of its link, and through that status, whether the link attached to the port is operational.

Ports can have different statuses. For example, a port can be in-service, out-of-service, or testing. If a port is in an out-of-service state, for example, a transmission link utilizing that port typically cannot be used. However, the port at the other end of the transmission link is unaware of the status of the port on the other end, and in the view from that port, the transmission link is operational.

One approach used to test a transmission link between two devices is referred to as a loop-back test. In a loop-back process, a signal is sent over a transmission link from a first device to the second device. The message is immediately "looped-back" to the first device. In this manner, the transmission link can be tested to determine whether the transmission link is operational.

One problem with loop-back testing is that the transmission link is out of service while the loop-back testing is occurring. In addition, loop-back testing is typically a test condition, meaning that it is operator-driven. Typically, a loop-back test is performed after determining that there is a problem with the transmission link. The loop-back test is just one test used to determine the state of the link. Consequently, since the loop-back test is run only after an error has occurred, the loop-back test is not a real-time way of determining the status of the transmission link.

Therefore, a need exists for a method and apparatus that is able to determine in real-time the status of a transmission link between two devices.

SUMMARY OF THE INVENTION

It is an object of the present invention to provide a real-time solution to the aforementioned problem by utilizing the states of a first port and a second port to determine the status of a transmission link disposed between the first and second ports.

The present invention provides a method, apparatus, management device, and communication system for determining the status of a transmission link between a first port of a first device and a second port of a second device. The first device and the second device can be a switch, a phone, a computer, a modem pool, or any other piece of electronic equipment that is able to be coupled to another device.

The preferred embodiment of the present invention comprises receiving at the management device a first status of the first port and a second status of the second port. The first status is preferably determined at the first device and sent to the management device, while the second status of the second device is preferably determined at the second device and sent to the management device. The management device, which is preferably located remotely from the first device and the second device, receives the first status via a first path and the second status via a second path that is distinct from the first path. The first path and the second path can be distinct from the transmission link. The management device then calculates the status of the transmission link based on the first status and the second status.

In the preferred embodiment, the step of calculating the status of the transmission link comprises the step of setting the status of the transmission link to the greater, or most critical, of the first status and the second status. Accordingly, the status of the transmission link is calculated to be out-of-service if either the first status or the second status indicates that either link is out-of-service. An alarm can be sent when the status is calculated to be a predetermined value, such as an out-of-service alarm. In addition, a log can be updated when the status is calculated to be a predetermined value.

DESCRIPTION OF THE PREFERRED EMBODIMENT(S)

Figure 1:
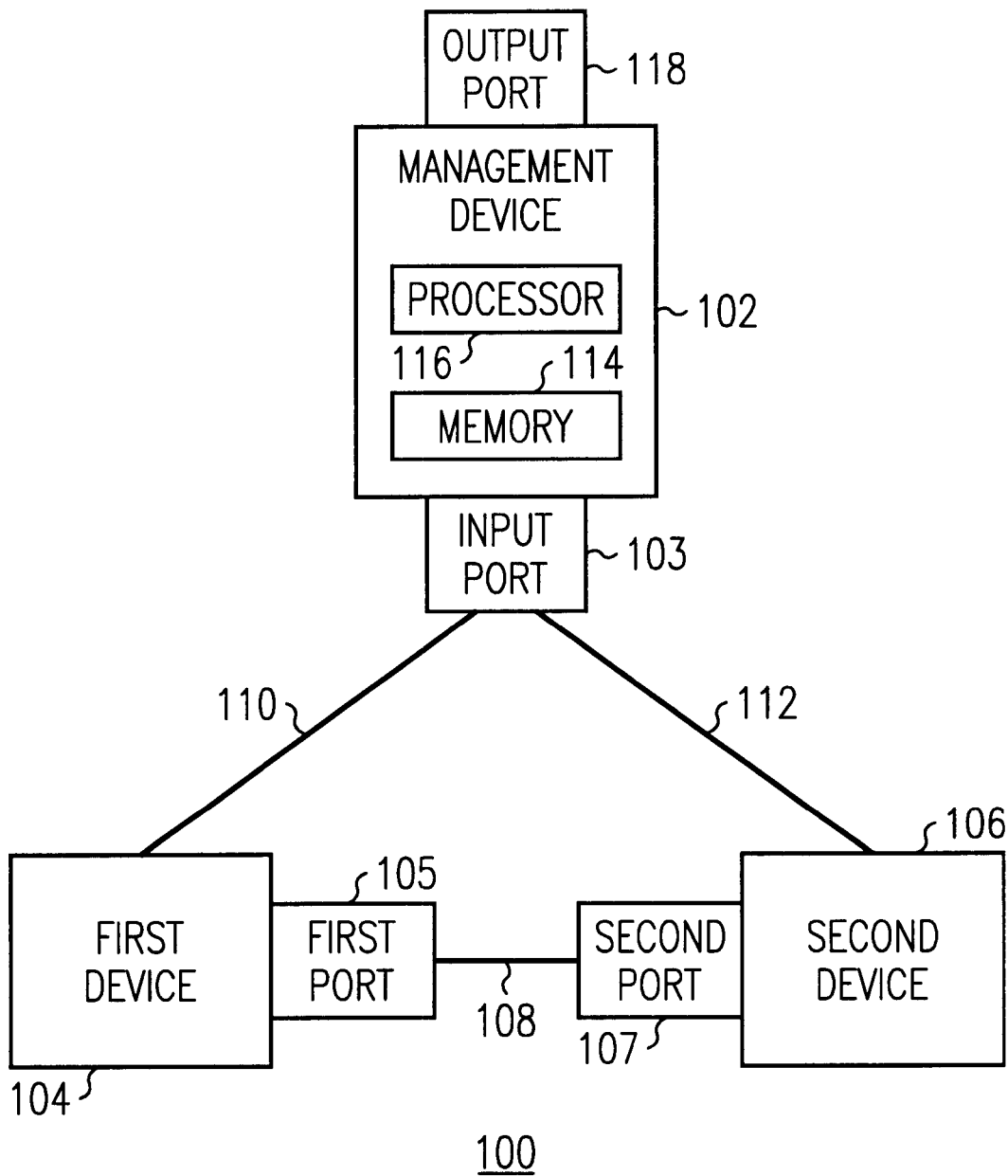
FIG. 1 depicts a communication system including a management device coupled to a first device and a second device in accordance with the preferred embodiment of the present invention.

FIG. 1 depicts a communication system 100 including a management device 102 coupled to a first device 104 and a second device 106 in accordance with the preferred embodiment of the present invention.

Management device 102 preferably includes an input port 103, a processor 116, and memory 114. Input port 103 is effective in receiving a first status of first port 105 and a second status of second port 107. Input port 103 is preferably an Ethernet connection running TCP/IP (Transmission Control Protocol/Internet Protocol). It should be understood that management device 102 can include a plurality of input ports, but only one is depicted for clarity. In the preferred embodiment, management device 102 is located remotely from first device 104 and second device 106.

Processor 116 is effective for calculating the status of transmission link 108. In the preferred embodiment, processor 116 calculates the status of transmission link 108 based on the first status of first port 105 and the second status of second port 107.

Memory 114 is effective in storing the status of transmission link 108. Memory 114 can be Random Access Memory (RAM), electromagnetic, optical, flash, or any other media effective in storing the status of transmission link 108.

Management device 102 preferable includes an output port 118 that is effective in outputting the status of transmission link 108. This port is preferably a Graphical User Interface (GUI), but can alternately be a command line interface, a printer, a browser, or a terminal. The port is preferably connected to a monitoring device, such as a terminal, personal computer, or workstation, for operation and use of the system.

Management device 102 is effective for determining the status of a transmission link 108. Transmission link 108 is a link, such as T1, E1, DS3, E3, STS1, OC3, or OC12, disposed between a first port 105 of a first device and a second port of a second device, the management device comprising:

First device 104 is coupled to management device 102 and includes a first port 105. First device 104 is preferably a switch, but can alternately be a phone, a computer, a modem pool, or any communication equipment that is linked to another piece of communication equipment and also linked to a management device.

Second device 106 is coupled to management device 102 and includes a second port 107. Second device 106 is preferably a switch, but can alternately be a phone, a computer, a modem pool, or any communication equipment that is linked to another piece of communication equipment and also linked to a management device.

Transmission link 108 couples first device 104 and second device 106 and is disposed between first port 105 and second port 107.

In the preferred embodiment, first device 104 is coupled to management device 102 by first path 110, and second device 106 is coupled to management device 102 by second path 112. First path 110 and second path 112 are preferably distinct from each other, and paths 110 and 112 are also preferably distinct from transmission link 108. By isolating first path 110, second path 112, and transmission link 108, the status of the links can still be communicated when any of the paths are down or non-operational.

Figure 2:
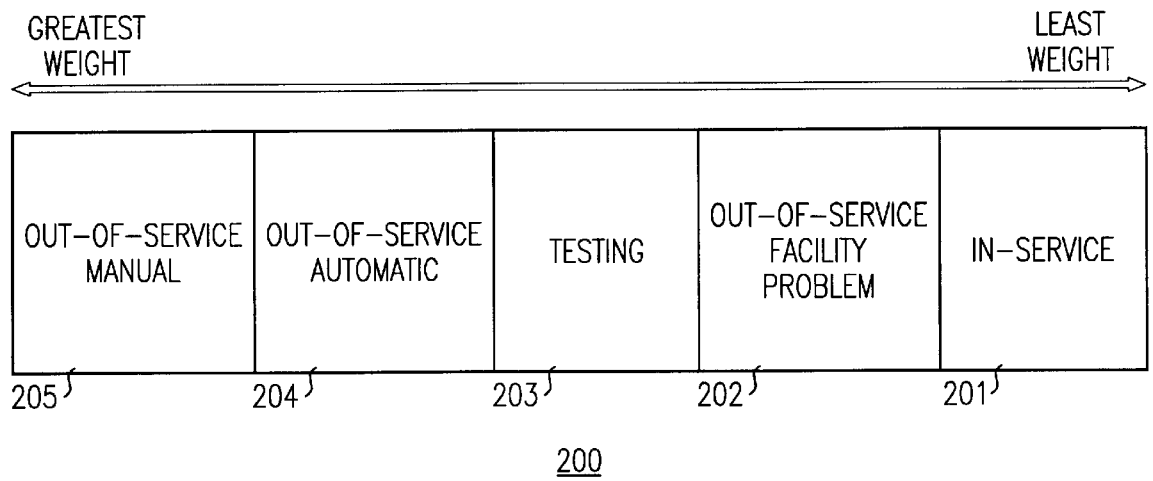
FIG. 2 depicts a state information block relating to the state of a port in accordance with the preferred embodiment of the present invention.

FIG. 2 depicts state information 200 relating to the state of a port in accordance with the preferred embodiment of the present invention. State information 200 preferably includes in-service bit 201, out-of-service facility problem bit 202, testing bit 203, out-of-service automatic bit 204, and out-of-service manual bit 205. In the embodiment depicted in FIG. 2, out-of-service manual bit 205 is the most significant bit, and in-service bit 201 is the least significant bit.

Figure 4:
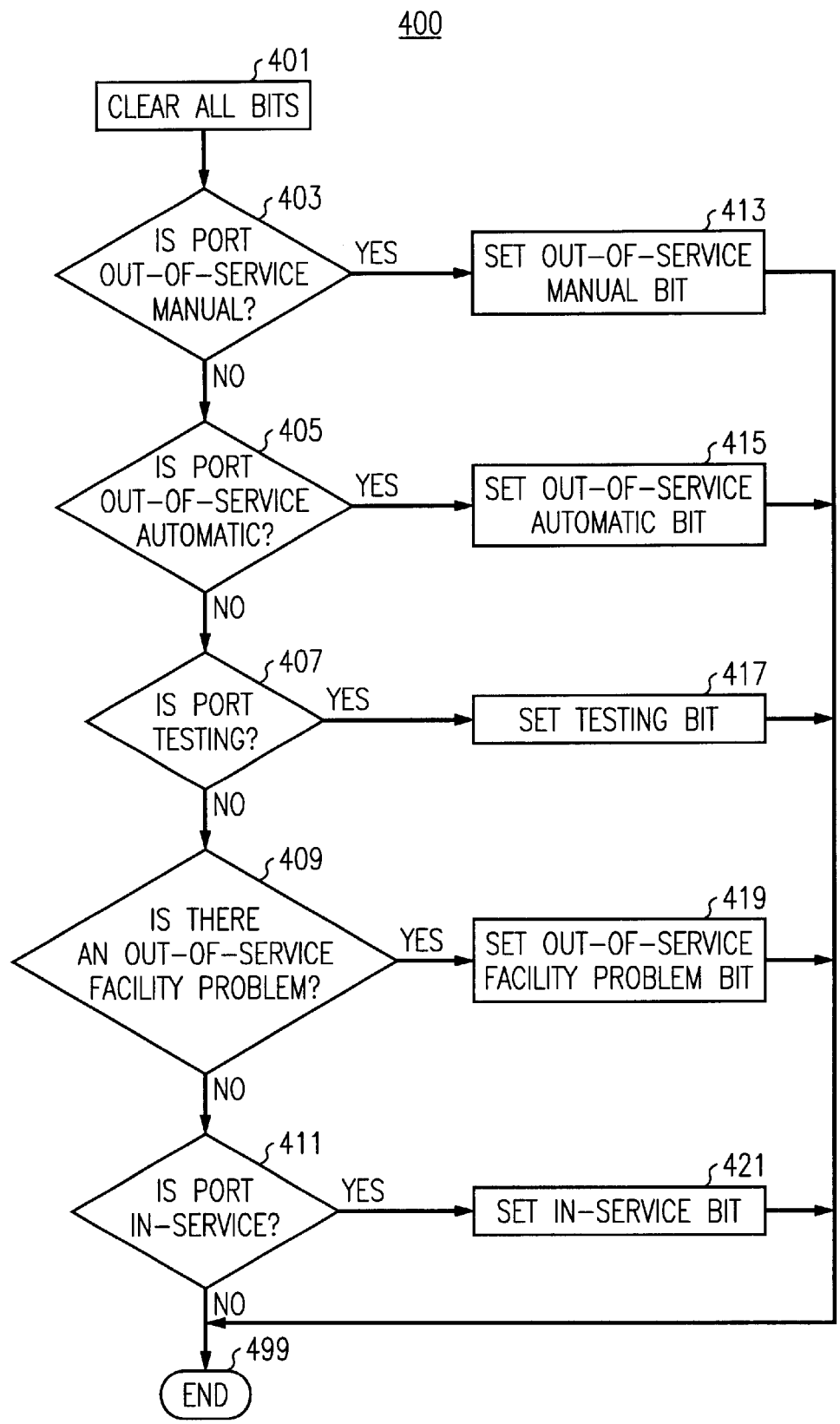
FIG. 4 depicts a flowchart for determining the status of a port of a device in accordance with the preferred embodiment of the present invention.

In the preferred embodiment as depicted in FIG. 4, each port has a state information block, and each of these bytes is cleared prior to determining the status of the port. As the state is checked, preferably from the most significant end to the least significant end, a bit is set if a condition is found, and the byte is then returned. In the preferred embodiment, the management device performs an ORing operation on the two bytes. This sets the status of the transmission link between the two ports to the higher, or most significant, of the two ports that define the transmission link.

Figure 3:
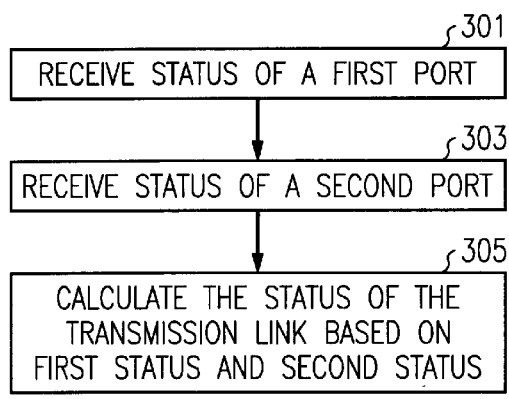
FIG. 3 depicts a flowchart for calculating the status of a transmission link in accordance with the preferred embodiment of the present invention.

FIG. 3 depicts a flowchart 300 for calculating the status of a transmission link in accordance with the preferred embodiment of the present invention. In the preferred embodiment of the present invention, the management device calculates the status of the transmission link. Alternately, the first device or the second device can calculate the status of the transmission link.

In accordance with the preferred embodiment, the management device receives (301) the status of a first port. The determination of the first status of the first port is preferably done at a first device to which the first port is connected, as described below with regard to FIG. 4. In the preferred embodiment of the present invention, the first status of the first port is sent from the first device to the management device. The first status is preferably sent from the first device to the management device via a first path that connects the first device to the management device.

The management device receives (303) the second status of a second port. The determination of the second status of the second port is preferably done at a second device to which the second port is connected, as described below with regard to FIG. 4. In the preferred embodiment of the present invention, the second status of the second port is sent from the second device to the management device. The second status is preferably sent from the second device to the management device via a second path that connects the second device to the management device. In the preferred embodiment, the first path and the second path are distinct from each other. Alternately, the first path and the second path can be on the same link.

The status of the transmission link between the first port and the second port is then calculated (305) based at least in part upon the first status and the second status. In the preferred embodiment of the present invention, the calculation is done at the management device. The management device calculates the status of the transmission link by setting the transmission link status to the most significant bit of the first status and the second status.

As one example, if the first status or the second status is out-of-service, the status of the transmission link is calculated to be out-of-service.

After calculating the status of the link, the management device can send an alarm when the status is calculated to be a predetermined value. For example, if the status is determined to be out-of-service, an alarm can be sent to an operator to alert the operator of the out-of-service state. Further, the management device can update a log, such as an error log, when the status is calculated to be a predetermined value. This can assist in determining any conditions that lead to error conditions. Still further, the status can be stored at the management device or in memory coupled to the management device. This stored status can then be used for comparisons, calculations, or display at a later time.

FIG. 4 depicts a flowchart 400 for determining the status of a port of a device in accordance with the preferred embodiment of the present invention. In the preferred embodiment of the present invention, the process of flowchart 400 is accomplished in the first device and the second device. The first device utilizes flowchart 400 to determine the status of the first port. The second device utilizes flowchart 400 to determine the status of the second port. In the preferred embodiment, the first device will send the status of the first port to the management device, and the second device sends the status of the second port to the management device. The management device uses these status values to calculate the status of the transmission link between the first port and the second port.

The process of flowchart 400 is described below with regard to the first device determining the status of the first port. It should be understood that the same process is preferably utilized by the second device to determine the status of the second port. For clarity, only a description of the first device determining the status of the first port is given below.

In accordance with the preferred embodiment, the first device clears (401) all bits. The first device then determines (403) if the first port is in an out-of-service manual mode. Out-of-service manual mode refers to a situation where a technician instructs the system to take the port out-of-service. This is typically done for system maintenance purposes. If the first port is out-of-service, the first device sets (413) the out-of-service manual bit. The process then ends (499).

If the first port is not in out-of-service manual mode, the first device determines (405) if the first port is in an out-of-service automatic mode. Out-of-service automatic refers to a situation where a device or port fails and the system recovers from the failure. The recovery typically leaves the device or port out-of-service automatic if the failure cannot be repaired automatically through initialization or other automatic action. If the first port is in this mode, the first device sets (415) the out-of-service automatic bit. The process then ends (499).

If the first port is not in out-of-service automatic mode, the first device determines (407) if the first port is in a testing mode. determines (407) if the first port is in a testing mode. Testing mode refers to a situation where the port is currently involved in running a loop-back or other facility test. If the first port is in a testing mode, the first device sets (417) the testing bit, and then ends (499).

If the first port is not in testing mode, the first device determines (409) if the first port is in an out-of-service facility problem mode. Out-of-service facility problem mode refers to a situation where a condition exists indicating a problem in the signal received over the link from the other port. This may be due to a physical severing of a cable or fiber. If the first port is in such a mode, the first device sets (419) the out-of-service facility problem bit, and then ends (499).

If the first port is not in an out-of-service facility problem mode, the first device determines (411) if the first port is in-service. In-service indicates that the port is operating properly. If the first port is in-service, the first device sets (421) the in-service bit, and the process then ends (499).

It should be understood that other factors can be considered when calculating the status of the first and second ports. Further, the factors can be placed in alternate orders to change the priority of the conditions that each port is currently in. In addition, although the preferred embodiment utilizes an ORing operation to choose the highest priority selected to determine the state of the transmission link, other operation could alternately be used to calculate the state of the transmission link.

The present invention thereby provides a method, apparatus, and communication system for determining the status of a transmission link. By sending the status of each port to a management device, the management device is able to calculate the status of the transmission link between the two ports based upon the status of each of the ports. In this manner, a reliable calculation of the status of the transmission link is obtained, thereby increasing system reliability and effectiveness.

Further, because the ports can send their status upon the occurrence of a predetermined condition, the status of the transmission link can be monitored in a much more timely fashion than the prior art. Since the status of the transmission link is determined by using the status of the ports, the transmission link does not need to be taken out of service in order to test its status. By using the status of each of the ports of the transmission link, a real-time or near real-time determination of the status of the transmission link can be obtained, without the need to take the link out of service to run a loop-back or similar test.

While this invention has been described in terms of certain examples thereof, it is not intended that it be limited to the above description, but rather only to the extent set forth in the claims that follow.

The embodiment of this invention in which an exclusive property or privilege is claimed are defined as follows.

We claim:

1. A method for determining the status of a transmission link between a first port of a first device and a second port of a second device, the method comprising the steps of:
   receiving at a management device a first status of the first port and a second status of the second port; and
   calculating at the management device the status of the transmission link based on the first status and the second status.

2. A method for determining the status of a transmission link in accordance with claim 1, wherein the step of receiving the first status and the second status comprises the step of receiving the first status and the second status at a management device located remotely from the first device and the second device.

3. A method for determining the status of a transmission link in accordance with claim 1, wherein the step of receiving the first status and the second status comprises the step of receiving the first status via a first path and receiving the second status via a second path.

4. A method for determining the status of a transmission link in accordance with claim 3, wherein the first path and the second path are distinct from each other.

5. A method for determining the status of a transmission link in accordance with claim 3, wherein the first path and the second path are distinct from the transmission link.

6. An apparatus for determining the status of a transmission link between a first port of a first device and a second port of a second device, the apparatus comprising:
   means for receiving a first status of the first port and a second status of the second port; and
   means for calculating the status of the transmission link based on the first status and the second status.

7. An apparatus in accordance with claim 6, wherein the means for receiving the first status and the second status comprises a management device.

8. An apparatus in accordance with claim 6, wherein the means for receiving is located remotely from the first device and the second device.

9. An apparatus in accordance with claim 6, wherein the means for receiving receives the first status via a first path and receives the second status via a second path distinct from the first path.

10. An apparatus in accordance with claim 6, wherein the first path and the second path are distinct from the transmission link.

11. An apparatus in accordance with claim 6, wherein the means for calculating the status of the transmission link comprises a management device.

12. A method for determining the status of a transmission link between a first port of a first device and a second port of a second device, the method comprising the steps of:
   determining a first status of the first port;
   determining a second status of the second port; and
   calculating the status of the transmission link utilizing the first status and the second status.

13. A method for determining the status of a transmission link in accordance with claim 12, wherein the step of calculating the status of the transmission link comprises the step of setting the status of the transmission link to the greater of the first status and the second status.

14. A method for determining the status of a transmission link in accordance with claim 12, wherein the status of the transmission link is calculated to be out-of-service if either the first status or the second status is out-of-service.

15. A method for determining the status of a transmission link in accordance with claim 12, the method further comprising the step of sending an alarm when the status is calculated to be a predetermined value.

16. A method for determining the status of a transmission link in accordance with claim 12, the method further comprising the step of updating a log when the status is calculated to be a predetermined value.

17. A method for determining the status of a transmission link in accordance with claim 12, wherein the step of determining the first status of the first port is performed at the first device.

18. A method for determining the status of a transmission link in accordance with claim 17, the method further comprising the step of sending the first status from the first device to a management device.

19. A method for determining the status of a transmission link in accordance with claim 12, wherein the step of determining the second status of the second port is performed at the second device.

20. A method for determining the state of a transmission link in a communication system in accordance with claim 19, further comprising the step of sending the second status from the second device to a management device.

21. A method for determining the status of a transmission link in accordance with claim 12, the method further comprising the step of storing the status.

22. A management device for determining the status of a transmission link between a first port of a first device and a second port of a second device, the management device comprising:

an input port effective in receiving a first status of the first port and a second status of the second port; and a processor for calculating the status of the transmission link based on the first status and the second status.

23. A management device in accordance with claim 22, the management device further comprising memory effective to store the status of the transmission link.

24. A management device in accordance with claim 22, the management device further comprising an output port effective to output the status of the transmission link.

25. A management device in accordance with claim 22, wherein:

the first status and the second status are associated with the first device and the second device, respectively; and the input port and the processor are located remote from the first device and the second device.

26. A management device in accordance with claim 25, wherein the input port receives the first status and the second status via a path other than the transmission link.

27. A communication system comprising:

a management device;

a first device coupled to the management device and including a first port;

a second device coupled to the management device and including a second port;

a transmission link coupling the first port to the second port; and a processor for calculating the status of the transmission link based at least in part upon the state of the first port and the second port.

28. A communication system in accordance with claim 27, wherein the first device is selected from a group consisting of a switch, a phone, a computer, and a modem pool.

29. A communication system in accordance with claim 27, wherein the second device is selected from a group consisting of a switch, a phone, a computer, and a modem pool.

30. A communication system in accordance with claim 27, wherein the processor is located in the management device.

* * * * *